United States Patent
Albornoz et al.

(10) Patent No.: US 8,572,060 B2
(45) Date of Patent: *Oct. 29, 2013

(54) E-MAIL BASED SEMANTIC WEB COLLABORATION AND ANNOTATION

(75) Inventors: Jordi A. Albornoz, Arlington, MA (US); Sean J. Martin, Boston, MA (US); Benjamin H. Szekely, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

This patent is subject to a terminal disclaimer.

(21) Appl. No.: 12/352,130

(22) Filed: Jan. 12, 2009

(65) Prior Publication Data

US 2009/0132528 A1 May 21, 2009

Related U.S. Application Data

(63) Continuation of application No. 10/973,889, filed on Oct. 26, 2004, now Pat. No. 7,478,105.

(51) Int. Cl.
*G06F 7/00* (2006.01)
*G06F 17/30* (2006.01)

(52) U.S. Cl.
USPC .......................................................... 707/705

(58) Field of Classification Search
USPC .......................................... 707/705, 999.102
See application file for complete search history.

(56) References Cited

U.S. PATENT DOCUMENTS 6,418,448 B1 * 7/2002 Sarkar .......................... 707/104.1
2002/0174126 A1 * 11/2002 Britton et al. ................. 707/100

OTHER PUBLICATIONS

Ibidunni, "Supporting workgroups collaborating via email using the semantic web and RDF," Nov. 22, 2002, 1-16.*
McDowell et al., "Semantic Email," May 17, 2004, 244-254.*
Naedele, "Standards for XML and Web Services Security," Apr. 1, 2003, ABB Corporate Research, 96-98.*
Blanton, "Microsoft(R) Computer Dictionary", Microsoft Press, Fifth Edition, Jan. 1, 2002, 88.*
Kalyanpur et al., "SMORE—Semantic Markup, Ontology, and RDF Editor," Nov. 16, 2002, 1-5.*
Bai et al., "Access Revocation and Prevention of False Repudiation in Secure Email Exchanges," Mar. 26, 2001, 419-425.*

* cited by examiner

*Primary Examiner* — Aleksandr Kerzhner
(74) *Attorney, Agent, or Firm* — Fleit Gibbons Gutman Bongini & Bianco PL; Thomas Grzesik

(57) ABSTRACT

Semantic Web attributes are transmitted via an electronic message such as an email message. The attributes are extracted from the message by a program agent according to a predetermined plan. The extracted attributes are saved in storage wherein the storage is optionally an annotation store.

20 Claims, 7 Drawing Sheets

E-MAIL BASED SEMANTIC WEB COLLABORATION AND ANNOTATION

CROSS-REFERENCE TO RELATED APPLICATIONS

The present patent application is a continuation of U.S. patent application Ser. No. 10/973,889 now U.S. Pat. No. 7,478,105 which was filed on Oct. 26, 2004 and commonly assigned herewith to International Business Machines, which is hereby incorporated by reference in its entirety.

FIELD OF THE INVENTION

The present invention is related to computer software systems. It is more particularly related to distributing Semantic Web attributes via electronic messaging.

BACKGROUND OF THE INVENTION

The Semantic Web provides a common framework that allows data to be shared and reused across application, enterprise, and community boundaries. It is a collaborative effort led by W3C with participation from a large number of researchers and industrial partners. It is based on the Resource Description Framework (RDF), which integrates a variety of applications using XML for syntax and URIs for naming. Information about RDF including "Resource Description Framework (RDF) Model and Syntax Specification found at "www.w3.org/TR/1999/REC-rdf-syntax-19990222"; "Resource Description Framework (RDF) Schema Specification at "www.w3.org/TR/1999/PR-rdf-schema-19990303"; and "RDF/XML Syntax Specification (Revised) at "www.w3.org/TR/rdf-syntax-grammar" all of which are incorporated herein by reference.

"The Semantic Web is an extension of the current web in which information is given well-defined meaning, better enabling computers and people to work in cooperation."—Tim Berners-Lee, James Hendler, Ora Lassila, The Semantic Web, Scientific American, May 2001. More information about the semantic web can be found on the World Wide Web in the W3C Technology and Society Domain document "Semantic Web" at www.w3.or/2001/sw incorporated herein by reference.

Preferably a central RDF metadata store is employed if the metadata generated by agents 312 must be persistently stored. In an example embodiment, HEWLETT-PACKARD DEVELOPMENT COMPANY's JENA framework is used as such a store. JENA is available for download on the World Wide Web at "www.hp1.hp.com/semweb/jena.htm".

Jena is a Java framework for writing Semantic Web applications. As from version 2.0 it has its own web site with all of the details and documentation on line:

Jena Overview:

Jena is a Java framework for writing Semantic Web applications. It features:

An RDF API
statement centric methods for manipulating an RDF model as a set of RDF triples
resource centric methods for manipulating an RDF model as a set of resources with properties
cascading method calls for more convenient programming
built in support for RDF containers—bag, alt and seq
enhanced resources—the application can extend the behavior of resources
integrated parsers and writers for RDF/XML (ARP), N3 and N-TRIPLES
support for typed literals ARP—Jena's RDF/XML Parser—ARP aims to be fully compliant with the latest decisions of the RDF Core Work Group. The Jena 2.0 version is compliant with the Editor's Working Drafts at time of release. ARP is typically invoked using Jena's read operations, but can also be used standalone.

Persistence:

The Jena2 persistence subsystem implements an extension to the Jena Model class that provides persistence for models through use of a back-end database engine. Jena2 is largely backwards-compatible for Jena1 applications with the exception of some database configuration options. The default Jena2 database layout uses a denormalized schema in which literals and resource URIs are stored directly in statement tables. This differs from Jena1 in which all literals and resources were stored in common tables that were referenced by statements. Thus, the Jena2 layout enables faster insertion and retrieval but uses more storage than Jena1. Configuration options are available that give Jena2 users some control over the degree of denormalization in order to reduce storage consumption.

The persistence subsystem supports a Fastpath capability for RDQL queries that dynamically generates SQL queries to perform as much of the RDQL query as possible within an SQL database engine. Currently, Jena2 can use three SQL database engines, MySQL, Oracle and PostgreSQL. These are supported on Linux and WindowsXP. As with Jena1, the persistence subsystem is designed to be portable to other SQL database engines.

Reasoning Subsystem:

The Jena2 reasoner subsystem includes a generic rule based inference engine together with configured rule sets for RDFS and for the OWL/Lite subset of OWL Full. These reasoners can be used to construct inference models which show the RDF statements entailed by the data being reasoned over. The subsystem is designed to be extensible so that it should be possible to plug a range of external reasoners into Jena, though worked examples of doing so are left to a future release. Of these components, the underlying rule engine and the RDFS configuration should be reasonably stable. The OWL configuration is preliminary and still under development.

Ontology Subsystem:

The Jena2 ontology API is intended to support programmers who are working with ontology data based on RDF. Specifically, this means support for OWL, DAML+OIL and RDFS. A set of Java abstractions extend the generic RDF Resource and Property classes to model more directly the class and property expressions found in ontologies using the above languages, and the relationships between these classes and properties. The ontology API works closely with the reasoning subsystem derive additional information that can be inferred from a particular ontology source. Given that ontologists typically modularise ontologies into individual, re-usable components, and publish these on the web, the Jena2 ontology subsystem also includes a document manager that assists with process of managing imported ontology documents.

RDQL query language:

RDQL is a query language for RDF data. The implementation in Jena is coupled to relational database storage so that optimized query is performed over data held in a Jena relational persistent store.

The above definition provides a basic foundation for inventions relating to the Semantic Web, but further technical refinement and additional definitions are needed to describe this invention. In the context of the Semantic Web, a page is any document or data item which contains links to other documents or data. Specifically, pages are not restricted to HTML documents which is the typical page in the World Wide Web. The links between pages are usually, but not always, defined in RDF. Furthermore, these links are semantic relationships in that they have a specific meaning or type. For example, "Author of" is such a relationship that may be used to link the page of an author to the page contain some publication. The Semantic Web also supports additional semantic metadata about pages. For example, a certain field in a page such as "Copyright Date" might itself be a standard way of indicating a copyright date instead of just a field labeled "Copyright Date."

This invention solves two problems. The first is how to extract knowledge from email messages with the purpose of streamlining workflow. Today, email is heavily used in the everyday workflow of organizations. Several special kinds of email have been used to speed up workflow. For example, special calendaring email clients will automatically negotiate for free time between meeting participants because the mails are in a particular format. This invention generalizes this idea to allow knowledge extraction from any email based on known terms and relationships.

The second problem is that of how to populate the semantic web with valuable pages and links. Semantic information such as fields with actual known meaning must be filled out. This is an extra step in the process of authoring web content that must be undertaken in order for the Semantic Web to succeed. By providing an automated approach to providing this metadata through email, this invention helps break down a large barrier to Semantic Web adoption.

SUMMARY OF THE INVENTION

It is the goal of the present invention to transmit semantic web attributes via an electronic message whereby a user at a client system, inserts in an electronic message, Semantic Web attributes and Semantic Web relationships for transmitting the electronic message over a network to a Semantic Web agent.

It is another goal of the invention to generate Semantic Web relationships by performing the steps of: receiving an electronic message, directing the electronic message to a Semantic Web Agent, the electronic message comprising one or more Semantic Web attributes and one or more Semantic Web data relationships, extracting from the electronic message a first attribute of the one or more Semantic Web attributes and a first data relationship of the one or more Semantic Web relationships, and saving the first attribute and the first data relationship in a searchable storage.

It is yet another goal of the present invention to provide an electronic message comprising any one of an email received over the internet or an Instant Message received over the internet.

It is another goal of the present invention to provide the electronic message with semantic web attributes and relationships comprise RDF.

It is still another goal of the present invention to provide the searchable database as an annotation store.

It is another goal of the present invention to provide the extracting step as any one of keyword analysis or natural language analysis.

It is yet another goal of the present invention to provide the extracting step as any one of the further steps of: searching the electronic message for predefined syntactic patterns indicating information of interest parsing a predefined document format such as XML or RDF within the electronic message, or performing natural language analysis of the electronic message.

It is another goal of the present invention to append the first attribute and first data relationship to predetermined attributes and relationships in the searchable storage.

It is another goal of the present invention to direct the electronic message to the Semantic Web agent when any one of: the received electronic message comprises any one of a message address of the Semantic Web agent or a Semantic Web ID of the Semantic Web agent, the received electronic message comprises an electronic identity of the Semantic Web agent, the identity located in a "CC" (Carbon Copy) portion of the electronic message, the electronic message is received by way of a message exchange infrastructure comprising any one of the SMTP/POP3 protocols or SMTP/POP3 servers, or an electronic message client sending the electronic message comprises a direct communication to the Semantic Web agent.

It is another goal of the present invention to perform the further steps of: retrieving Semantic Web attributes and Semantic Web relationships from the searchable store, the attributes and relationships comprising the first attribute and the first relationship, interpreting according to Semantic Web relationships and Semantic Web attributes, the retrieved Semantic Web attributes and Semantic Web relationships, and presenting the interpreted Semantic Web relationships and Semantic Web attributes to a user wherein the presented Semantic Web relationships and Semantic Web attributes comprise any one of: a project report, a conversation summary, summarized project data, summarized project data comprising references, summarized project data comprising semantic relationships, or browsing capability of semantic web related interconnected web items.

It is another goal of the present invention to perform the further steps of: inserting in the electronic message at a client computer, the first attribute of the one or more Semantic Web attributes and the first data relationship of the one or more Semantic Web relationships, and transmitting the electronic message over a network to the Semantic Web agent, the electronic message comprising the inserted first attribute and the inserted first data relationship.

It is another goal of the present invention to perform the further step of associating authorization information with any one of the first attribute or the first relationship wherein the associating authorization information is based on any one of system configuration information or explicit directives, the explicit directives included in the electronic message.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE PREFERRED EMBODIMENTS

Figure 1:
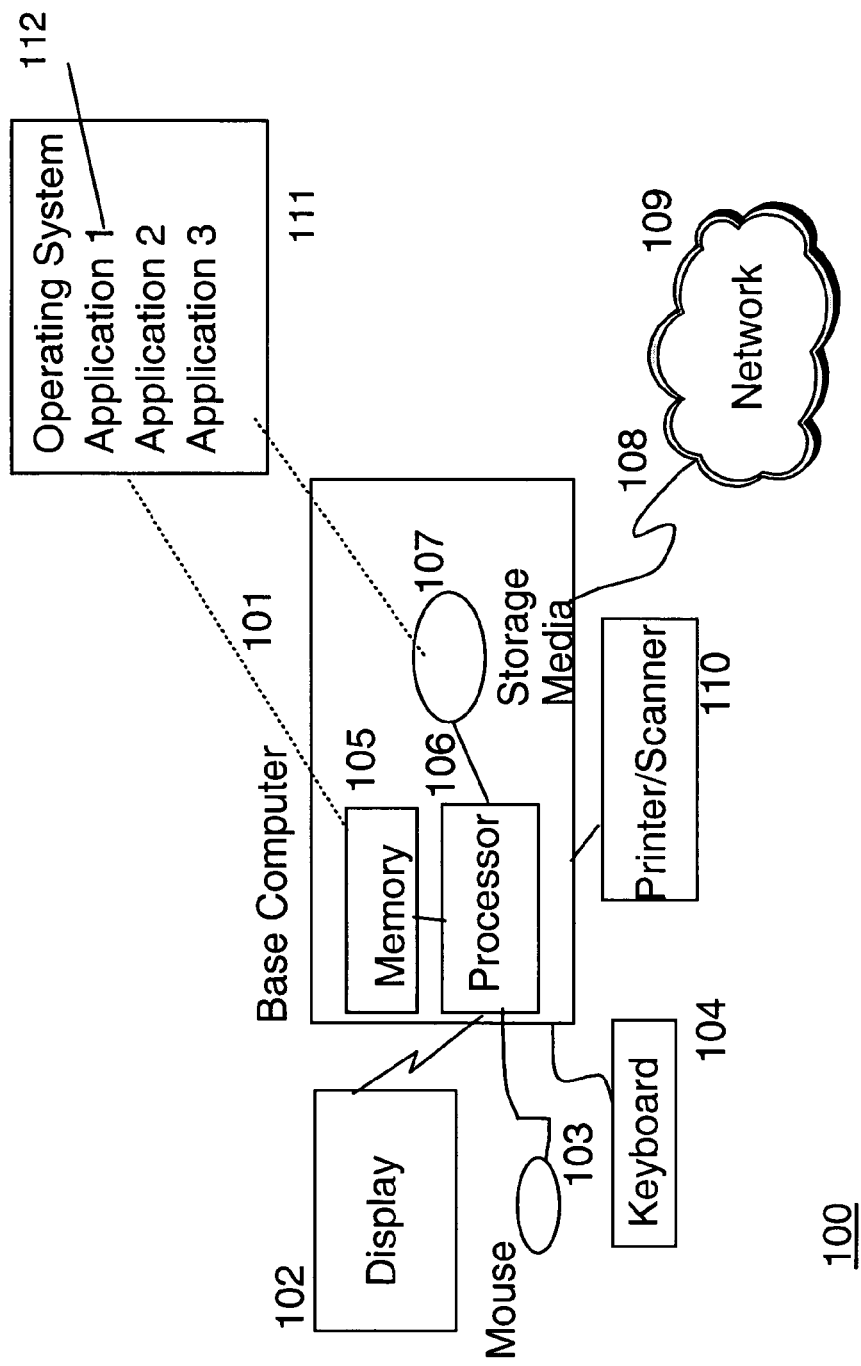
FIG. 1 is a diagram depicting prior art components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
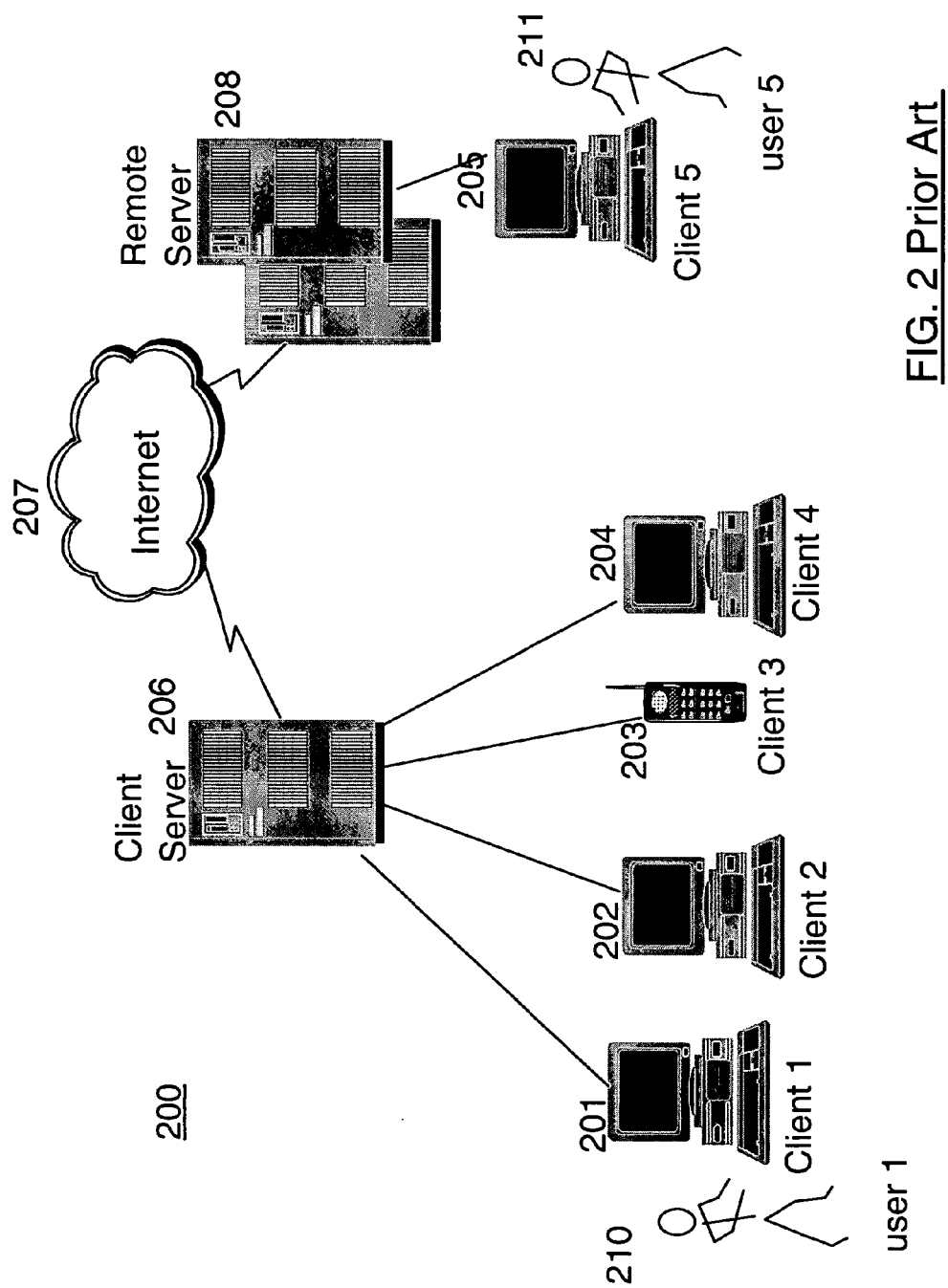
FIG. 2 is a diagram depicting a prior art network of computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

The present invention provides an automatically generated web of semantic relationships, that is, metadata, which relate the components and actors involved in users' tasks for example. The collected metadata can be queried and browsed, allowing our invention to serve as an organized record of the work done by users' and how different work and different users relate. Our invention uses electronic conversations and exchanges such as email to transmit and the semantic metadata to a semantic metadata application or database.

Figure 3:
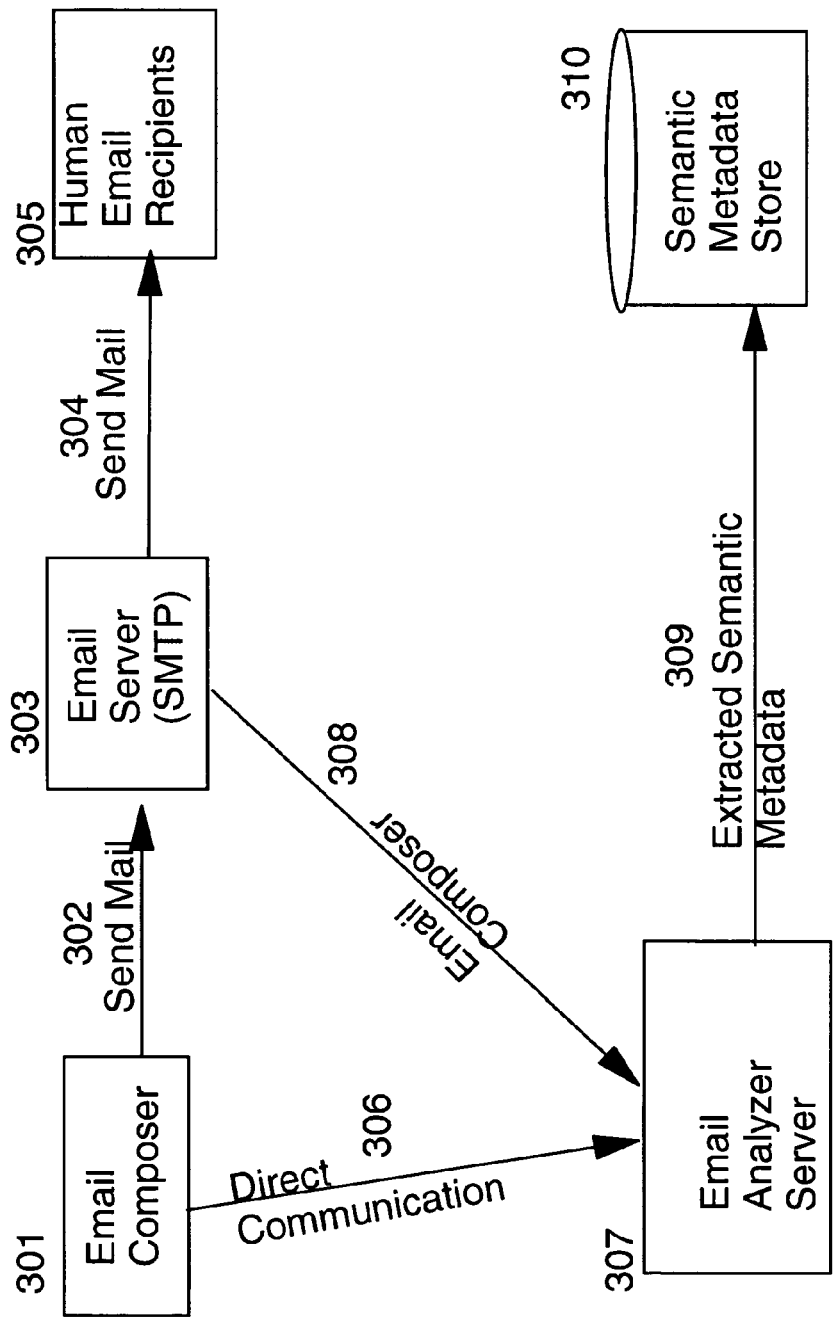
FIG. 3 depicts the flow of example components of the invention.

In FIG. 3, the process of inserting data into the semantic metadata store is illustrated. The email shows that the process taken by the user is not modified. The email is still sent and received as usual. An email composer client 301 supports an application that receives user information (such as text or file attachments) and packages it to be transmitted 302 to a target address 303 wherein it is made available 304 to human or automated (program agent) clients 305. Preferably, an email analyzer program agent 307 also receives the email either through direct communication 306 with the email client 301 or via 308 the SMTP server 303 responsible for routing the message through the internet. The results of the analyzer 307 are a set of semantic relationships preferably comprising RDF statements. The results are stored 309 in a semantic metadata store 310 which can then be browsed using a variety of clients.

Figure 4:
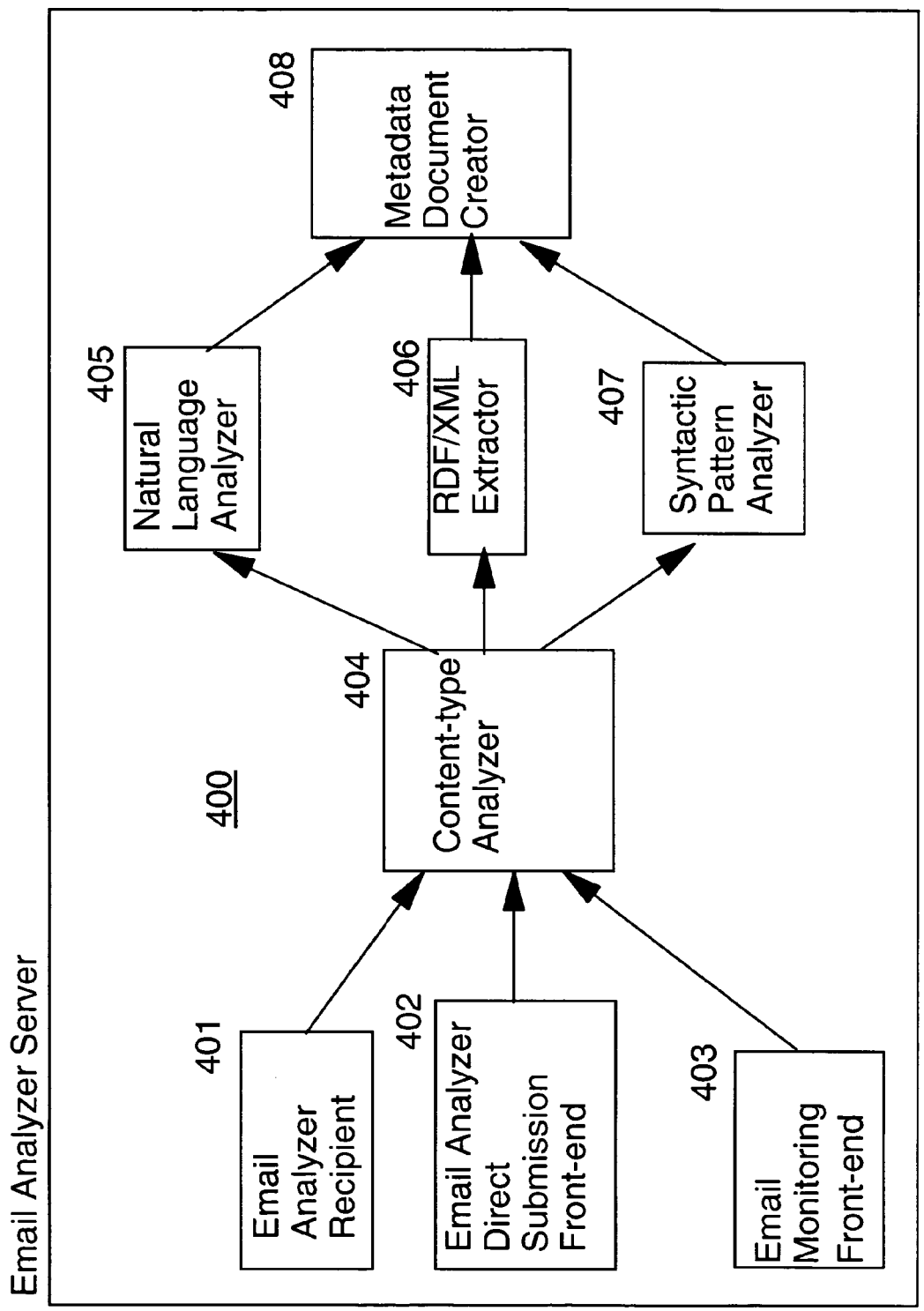
FIG. 4 depicts an email analyzer example of the invention.

FIG. 4 is a view of the preferable function of the email analyzer 401. The analyzer 401 may receive the email via a number of means including assuming the role of a recipient 401 wherein the analyzer has an addressable ID in the network or is associated with a server having such an ID, the analyzer having a direct role with the submission front-end 402 perhaps as a plugin or via an API or the analyzer monitoring all email transmissions 403 according to a predetermined plan. The analyzer 400 analyzes the content 404 to determine the appropriate analysis method for the message. For instance, it may choose to use a natural language analyzer 405 to extract the semantic metadata, or there may be semantic metadata already embedded in the message 406, perhaps as RDF. Also, it may recognize special syntactic patterns 407 that are entered by the user as a shorthand way of including metadata directly. It may use a combination of these approaches as well. The results of the analysis are then combined into a metadata document 408 in preparation for transmission to the semantic metadata store.

TABLE 1

| | |
|---|---|
| 1 | To: Joe Manager |
| 2 | CC: miner@example.com |
| 3 | From: Bob Scientist |
| 4 | Subject: Temperature on Cell Proliferation Results |
| 5 | Hi Joe, |
| 6 | The results of the experiment look very promising. There might be a treatment lead here since temperature affects cancer proliferation at levels that remain safe for healthy cells. Note the rate at 99 degrees. Here is my experiment summary: |
| 7 | Project: Cancer Cell Proliferation (urn:lsid:example.com:projects:ccp) |
| 8 | Experiment: Effect of Temperature on Proliferation Rate (urn:lsid:example.com:experiment:temperature) |
| 9 | References: |
| 10 | urn:lsid:pubmed.org:articles:234443 |
| 11 | urn:lsid:pubmed.org:articles:776543 |
| 12 | urn:lsid:pubmed.org:articles:999983 |
| 13 | Hypothesis: |
| 14 | Higher temperatures will lower the cancer cell proliferation rate due to enzyme deactivation. |
| 15 | Methods: |
| 16 | Assay 13 (urn:lsid:mylab.com:assay:13) |
| 17 | Proliferation rate from series of images using JEdit (urn:ncbi.org:algorithms:jedit122) |
| 18 | Data: |
| 19 | urn:lsid:mylab.com:data:img12.tiff |
| 20 | urn:lsid:mylab.com:data:img13.tiff |
| 21 | Results: |
| 22 | Proliferation Rate vs. Temperature Chart (urn:lsid:mylab.com:data:ratechart.tif) |
| 23 | Proliferation Data Calculation (urn:lsid:mylab.com:data:ratedata.xls) |

Table 1 illustrates an example email which is intercepted by the email analyzer.

Notice that the email was cc'd to 'miner@example.com' (Table 1, line 2). This is a hypothetical address which sends the email to a deployment of our invention (program agent) as deployed in the hypothetical life sciences company 'My Lab'. The agent (analyzer agent) will then search the email for relationships between different pieces of information such as the relationship between the experiment (Table 1, line 8) and the references (Table 1, lines 9-12) or the relationship between the graph of the proliferation rate (Table 1, line 22) and the raw data (Table 1 lines 18-20) used to arrive at that graph. The system for search the email can be as simple as looking for keywords and a predefined, regular format (which this example accommodates) or as complex as advanced natural language parsing techniques or some combination of simple and complex methods for extracting the relationships. The invention will parse the email and build a graph of relationships between the data combine and store it with any current graph of semantic relationships it already has obtained from previous emails. In this manner a 'semantic web' of data is created in the system that facilitates collaboration and essentially alleviates the project manager from serving as a communications hub and allows him to focus on the evaluation and guidance of further projects.

In one embodiment of the invention, the program agent would build the semantic data and append the data to the current repository of semantic data. Upon receiving the email describing the experiment, the agent parses the email for a known regular pattern. For example using Keywords, it looks for the phrases 'Project', 'Experiment', 'References', 'Hypothesis', 'Methods', 'Data', and 'Results'. Upon finding one of those headings in the email, it builds a relationship to capture that aspect of the experiment by taking the set of lines that follows the heading until another heading is found or the end of the email is reached.

The agent uses a list of known semantic predicates to create the relationships such as 'HasExperiment' and 'YieldsResults'. The 'HasExperiment' predicate for example, relates a project to the experiment. Similarly, the 'YieldsResults' relationship relates an experiment to the resulting data it yields. In the embodiment, the agent parses the information looking for special identifiers surrounded by parentheses. If it finds one, it uses that to identify the artifact such as a project or experiment rather than a human readable name. This is more robust as such identifiers are intended to be unique. When the identifiers are used, a human readable label is also associated for convenience using the 'HasLabel' relationship. A sampling of the relationships that are generated by such an example embodiment is shown below:

TABLE 2

| | |
|---|---|
| 1 | urn:lsid:example.com:projects:ccp HasExperiment urn:lsid:example.com:experiment:temperature |
| 2 | urn:lsid:example.com:projects:ccp HasLabel "Cancer Cell Proliferation" |
| 3 | urn:lsid:example.com:experiment:temperature HasLabel "Effect of Temperature on Proliferation Rate" |
| 4 | urn:lsid:example.com:experiment:temperature HasReference urn:lsid:pubmed.org:articles:234443 |
| 5 | urn:lsid:example.com:experiment:temperature HasReference urn:lsid:pubmed.org:articles:776543 |
| 6 | urn:lsid:example.com:experiment:temperature HasReference urn:lsid:pubmed.org:articles:999983 |
| 7 | urn:lsid:example.com:experiment:temperature HasMethods urn:lsid:mylab.com:assay:13 |
| 8 | urn:lsid:mylab.com:assay:13 HasLabel "Assay 13" |
| 9 | urn:lsid:example.com:experiment:temperature HasData urn:lsid:mylab.com:data:img12.tiff |
| 10 | urn:lsid:example.com:experiment:temperature HasData urn:lsid:mylab.com:data:img13.tiff |
| 11 | urn:lsid:example.com:experiment:temperature HasResults urn:lsid:mylab.com:data:ratechart.tif |
| 12 | urn:lsid:mylab.com:data:ratechart.tif HasLabel "Proliferation Rate vs. Temperature Chart" |

The sample web of relationships extracted from the email shown in table 2 is shown in an abbreviated Resource Description Framework (RDF) format. Each line (for example line 11) contains a triple such that the first item is the subject of the relationship (urn:lsid:example.com:experiment:temperature), the second item is the predicate of the relationship (HasResults), and the third item is the object of the relationship (urn:lsid:mylab.com:data:ratechart.tif). When the agent extracts this information, it is then ready to merge the information into the complete semantic data storage system that contains all of the relationships collected over time. The semantic metadata store is preferably a 'Jena' RDF database. The Jena database insertion mechanism will take the relationships generated by the agent and place them into the database. Once they are in the Jena database, a query language can be used by other systems and applications such, as for example, user interfaces that are presenting the semantic web of data in a rendered form.

For example, because of the semantic web that is progressively built up from running our invention upon many communications such as the example above, related data becomes more easily discovered. For instance, imagine that someone else had done an experiment using Assay 13 as in the Table 2 example above and had referenced one of the same papers. In such a situation, the link becomes easily apparent when browsing the relationships stored in our invention. When the researcher browses outbound links from his experiment, the link to "Assay 13" will be discovered, and in turn other experiments that link to "Assay 13". Thus the researcher may more easily discover similar research that the project manager may not have even been aware of.

Another advantage is that the storage of these relationships captures the context of the experiment. Browsing the items semantically related to a project, one can easily follow a web of relationships thus easily browsing to discover related data, projects, or experiments.

Table 1 is an example of an email that can be processed by all of natural language processing 405, syntactical parsing based on a known ontology 407, and also, the URIs contained in the document can be resolved by the analyzer and thus obtain metadata from them directly for use in its analysis. In the example, the URIs are Life Science Identifiers (LSID) which are defined by the Object Management Group (OMG) as a standard identifier for life science data that can hold rich semantic metadata. Given an LSID for a piece of data, a software system can, from any location, resolve the metadata associated with that piece of data. This metadata is most often RDF containing semantic links and relations between the piece of data and other data. LSID standards can be found at: www.omg.org/cgi-bin/doc?dtc/04-05-01 from Object Management Group, Inc. "Life Sciences Identifiers final adopted Specification—dtc/04-05-01"

Open Source implementations of the LSID standards are maintained by IBM and can be downloaded at: www-124.ibm.com/developerworks/oss/lsid/

Figure 5A:
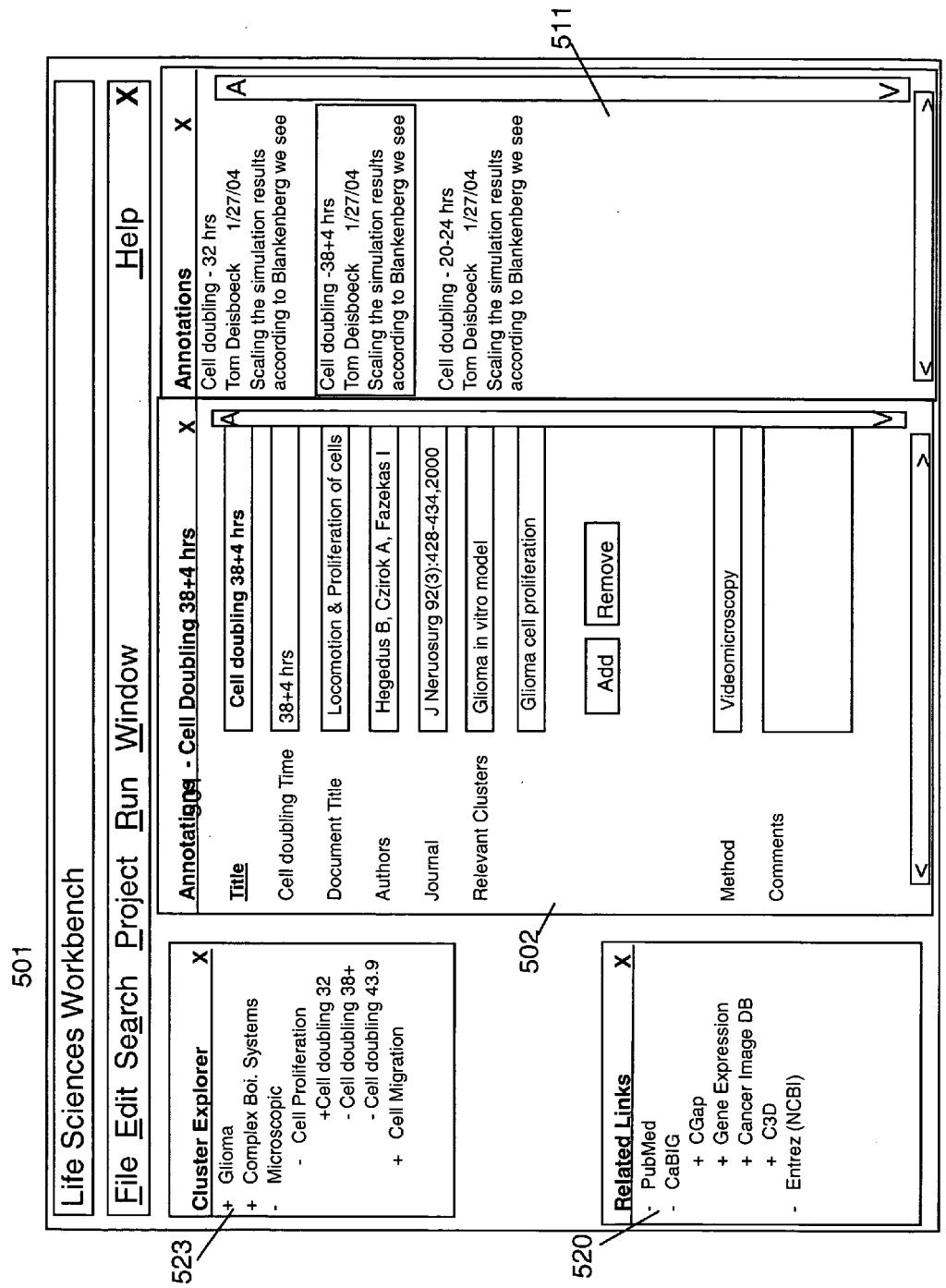
FIGS. 5A-5C depict an example view of an embodiment of the invention.
Figure 5B:
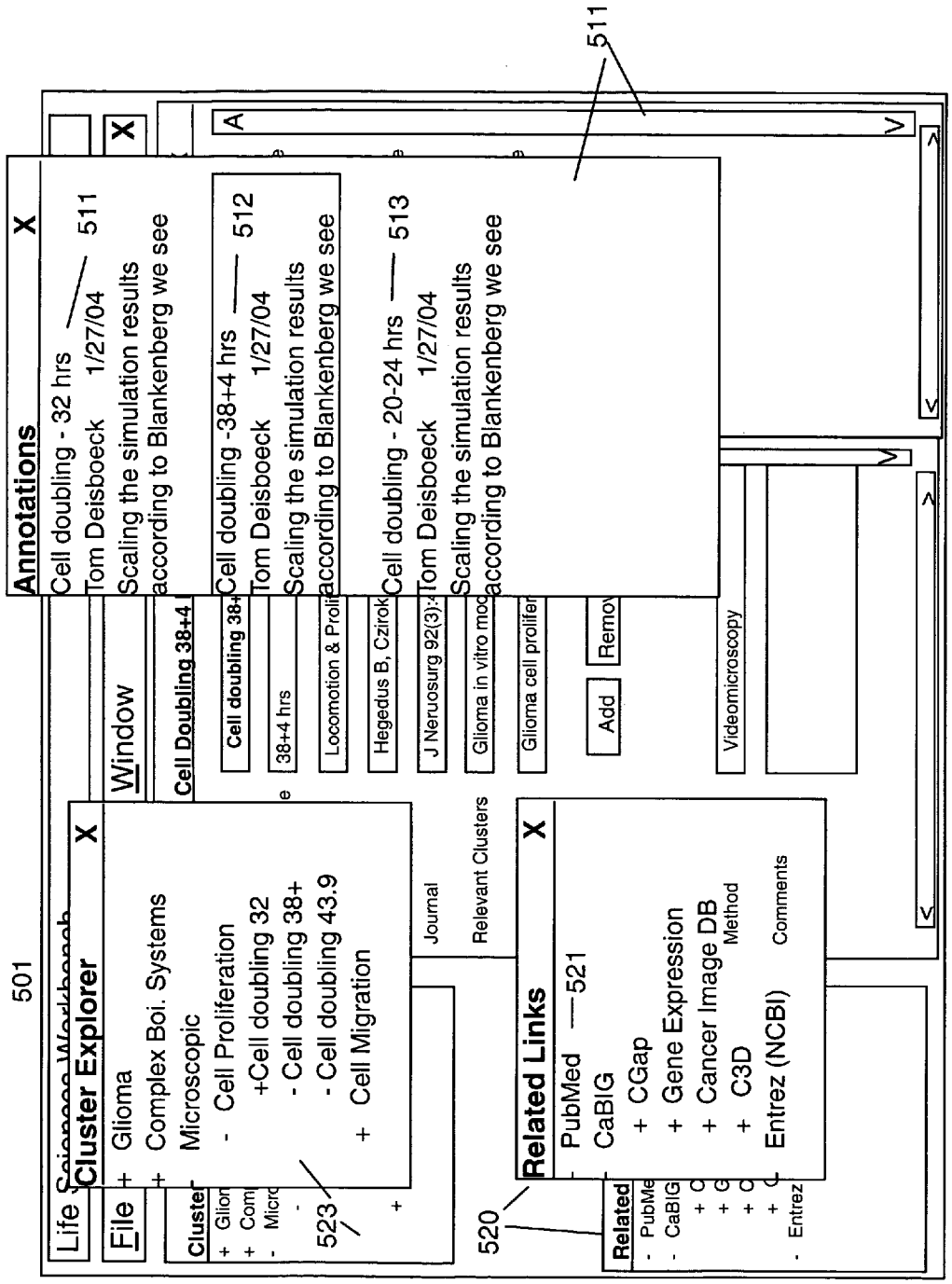
Figure 5C:
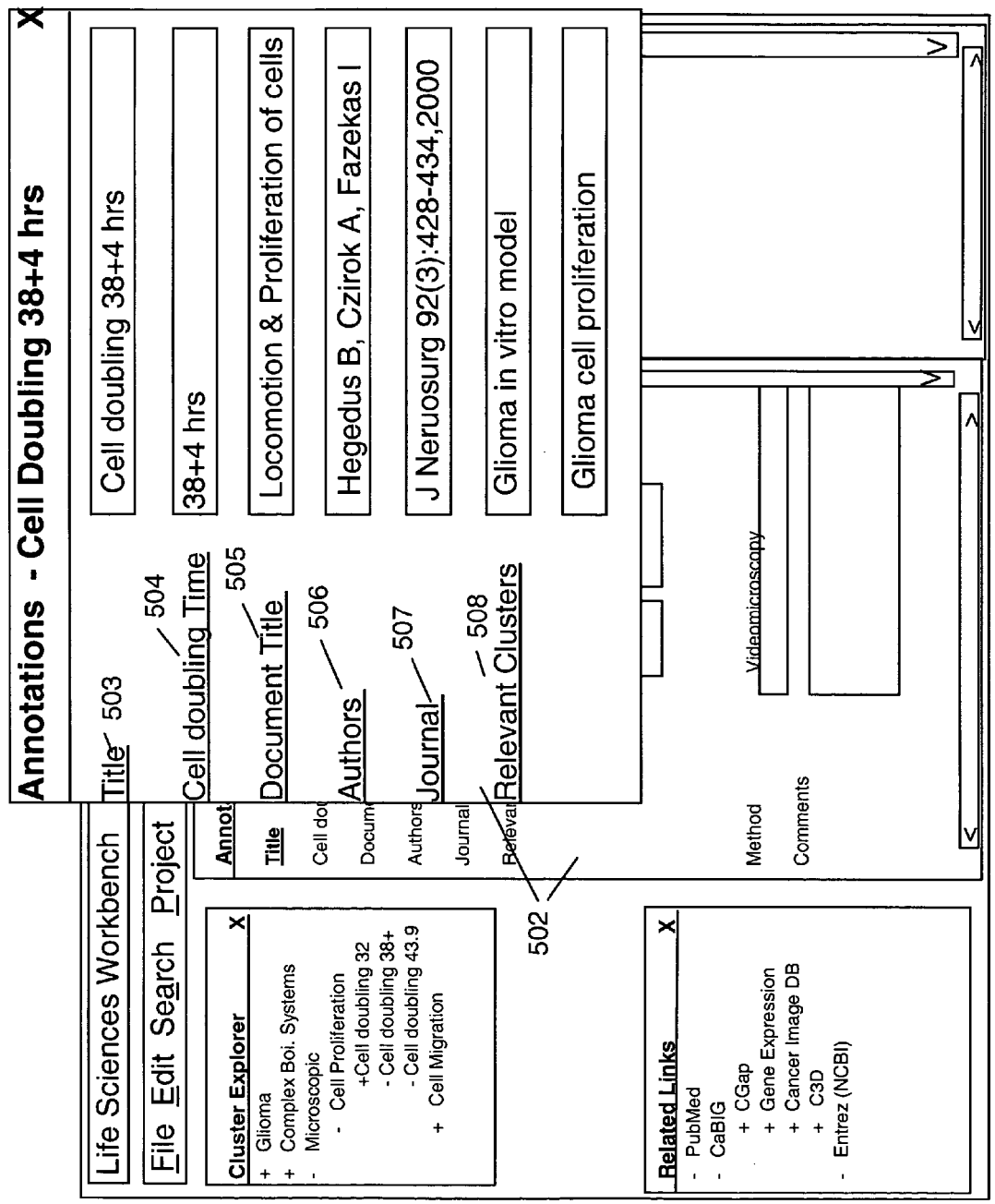

FIGS. 5A-5C illustrate a possible interaction user interface view 501 that makes use of the metadata collected into the metadata store by our invention. FIG. 5A shows the example view 501. FIG. 5B Shows the view 501 with windows 520 523 and 511 expanded for clarity. FIG. 5C Shows the view 501 with the active experiment window 502 expanded for clarity. The illustration shows how the captured relationships can be explored to capture new ideas. The illustration shows a concise view 502 of an experiment being conducted by a researcher about cancer cell migration rates. The experiment is linked to multiple journal articles that show alternate results for cell doubling times and has links to data sources used in the experiment. These links are shown in the Related Links 520 section: PubMed 521. The annotations on the right 511 are the locations in the articles where the Cell Proliferation comes from. All of this data can be extracted from email communications within the team of cancer researchers. Our invention facilitates creation of such interfaces by extracting, storing, and providing the semantic relationships. This illustrates a very important aspect of our invention. Since the repository is globally queryable, meaning that the repository stores the semantic metadata from many conversations from different people and the repository can relate data extracted from one conversation to data extracted from other conversations, the system has a unique advantage of providing discovery of information for the user.

For example, imagine a researcher as in FIG. 5 above sees the articles that he has referenced while working on and discussing his project. The semantic metadata store knows everyone else that has also referenced that each article. The researcher can then follow the trail of who else has referenced the same article that he has referenced by following backlinks in an RDF store or doing an RDF RDQL search. In doing so, the researcher may learn of a project that is doing similar work and see the results of that project. This is a key advantage to the semantic web of knowledge that is being extracted automatically from email conversations. The advantage of our invention is that the researcher had to change little or nothing about how his work was accomplished, assuming as is common that most collaboration is done through email.

One embodiment of the system involves a semantic email analyzer and a semantic metadata store such that the email analyzer server is given an email address and users place that address in the CC field of emails when they want the email analyzed. The semantic metadata store in the preferred embodiment is an RDF database system such as the freely available Jena Semantic Web Framework for Java (found at URL: jena.sourceforge.net) and IBM DB2 database for storage of the RDF data.

RDF is the Resource Description Format, a standard data model defined by the World Wide Web Consortium (W3C). In RDF, data is represented in the form of "triples", or three-tuples. A triple consists of three items to make up an RDF statement: the subject, the predicate, and the object. RDF data can either be a Uniform Resource Identifier (URI) or a literal value. For example, an RDF statement that describes a person's age may appear as: "urn:JohnDoe urn:HasAge 23". This is not in any specific RDF syntax. It is merely for illustrative purposes. Many syntaxes and serializations of RDF data exist, such as the XML serialization defined by the W3C. In the example statement, the subject, John Doe, is represented as a URI to uniquely identify John Doe. The predicate, "Has Age" specifies the relationship between the subject and the object. The object, "23" is a literal value in this example.

Using RDF, the semantic metadata store is very flexible, since new relationships can be added trivially to add more metadata to current objects. Typical relational database stores make it difficult to have such flexibility. Adding new columns and tables to a relational database is not intended to be a common task. Also, RDF gives very powerful query ability as well. Furthermore, RDF allows for inferences to be made from the data, essentially automatically deducing relationships that are not explicitly stored. For example, if the metadata store includes the statements: "JohnDoe hasBrother Bill" and "JohnDoe hasSister Amy", then the RDF semantic metadata store can deduce the statement "Bill hasSister Amy" based on the semantics of the hypothetical "hasBrother" predicate. Thus a query for all of Bill's siblings would return Amy and JohnDoe.

These features of RDF allow our system to easily build a record of the work being achieved by email exchanges that it is observing. The email in FIG. 3 would place many RDF statements into the store and would thus allow researchers to browse the RDF graph of relationships as a log of the work they have done. They can pick a project and follow the appropriate predicates to see the articles they referenced in working on the project. More importantly, through query and possibly automatic inference, they can follow the graph further and learn things such as "What other projects referenced this paper?" or "Who else referenced this paper that used the confocal microscope?"

The user interface for performing such browsing and queries can be built using the Jena framework as well as user interface toolkits available for Java or other languages or systems. Tools for rendering graphs such as the freely available GraphViz (http://www.research.att.com/sw/tools/graphviz/) as well as user interface tools for browsing semantic metadata such as the experimental Haystack project (haystack.lcs.mit.edu/) can be used to provide a rich interface. The specific predicates that the user interface interprets and the inference rules around those predicates can be customized for each deployment of the system to better suit the needs of a particular team. Also, standard libraries of predicates, that is, ontologies, exist and should be used. The OWL Web Ontology Language created by the W3C can be used to specify these ontologies for the email analyzer and the query and inference engine.

The email analyzer can use a variety of methods for extracting the semantic metadata. One simple method is to look for predefined syntactic patterns such as shown in Table 2. The patterns can be associated in the analyzer's configuration with specific OWL ontologies and the system can format the data based on the ontology and place it into the semantic metadata store. The email analyzer can also use more advanced natural language extraction mechanisms. Many of these have been described in research literature. Preferably, the analyzer would use a pipeline approach where multiple extraction mechanisms are invoked, including possible literal inclusion of RDF possibly placed directly by in the email by the user's smart email client that is aware of this system.

one important consideration in the usage of the present invention is security and privacy. Our invention leaves room for specific access rights to be attached to the extracted relationships such that those browsing the semantic metadata do not stumble upon information that the author wanted to remain confidential or privy only to a select group of users. Every deployment's security and privacy requirements are different and the security can be handled at the semantic database level typically via configuration. In one embodiment, the intercepted email itself may contain instructions as to the access rights of the information contained within.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A method for generating Semantic Web relationships comprising:
    receiving, at an automated agent, an electronic message at a first dedicated network address from a user sender, the electronic message comprising the first dedicated network address and a second dedicated network address directing the electronic message to at least one user recipient, wherein the automated agent is separate and distinct from a messaging server configured to send the electronic message to the at least one user recipient based on the second dedicated network address;
    analyzing a set of content in the electronic message, wherein the set of content comprises one or more Semantic Web attributes and one or more Semantic Web data relationships in a Resource Description Framework ("RDF"), wherein the Semantic Web attributes and Semantic Web data relationships in a Resource Description Framework have been manually typed by the user sender in syntactic patterns directly into a body portion of the electronic message without a use of templates and an automated agent to implement the RDF;
    selecting, based on the analyzing, at least one semantic metadata analysis method from a plurality of semantic metadata analysis methods, wherein the plurality of semantic analysis methods comprises at least a natural language analysis method and a syntactic pattern analysis method;
    extracting, based on the selected semantic metadata analysis method, from the electronic message a first attribute of the one or more Semantic Web attributes and a first data relationship of the one or more Semantic Web relationships; and
    saving the first attribute and the first data relationship in a searchable storage.

2. The method according to claim 1, wherein the electronic message comprises any one of an email received over the internet or an Instant Message received over the internet.

3. The method according to claim 1, wherein the searchable storage comprises an annotation store.

4. The method according to claim 1, wherein the extracting comprises any one of keyword analysis or natural language analysis.

5. The method according to claim 1, wherein the extracting comprises performing natural language analysis of the electronic message.

6. The method according to claim 1, wherein the first attribute and first data relationship are appended to predetermined attributes and relationships in the searchable storage.

7. The method according to claim 1, wherein the automated agent receives the electronic message based on the user sender having manually directed the electronic message to the at least one other user and the automated agent by having actively inserted the dedicated network address associated with the at least one other user into a "To" field of the electronic message and having actively inserted the dedicated network address associated with the automated agent into a "CC" (Carbon Copy) portion of the electronic message.

8. The method according to claim 1, further comprising:
retrieving Semantic Web attributes and Semantic Web relationships from the searchable storage, the attributes and relationships comprising the first attribute and the first relationship;
interpreting according to Semantic Web relationships and Semantic Web attributes, the retrieved Semantic Web attributes and Semantic Web relationships; and
presenting the interpreted Semantic Web relationships and Semantic Web attributes to a user wherein the presented Semantic Web relationships and Semantic Web attributes comprise any one of:
a project report, a conversation summary;
summarized project data;
summarized project data comprising references;
summarized project data comprising semantic relationships; or
browsing capability of semantic web related interconnected web items.

9. The method according to claim 1, wherein data in the RDF is a set of Life Science Identifiers.

10. The method according to claim 1, wherein the extracting further comprises:
extracting instructions for access rights to the first attribute and the first data relationship;
in response to the access rights being granted, saving the first attribute and the first data relationship in the searchable storage; and
in response to the access rights failing to be granted, preventing the saving of the first attribute and the first data relationship in the searchable storage.

11. A computer program product for generating Semantic Web relationships, the computer program product comprising:
a non-transitory storage medium readable by a processing circuit and storing instructions for execution by the processing circuit for performing a method comprising:
receiving, at an automated agent, an electronic message at a dedicated network address from a user sender,
the electronic message comprising the first dedicated network address and a second dedicated network address directing the electronic message to at least one user recipient, wherein the automated agent is separate and distinct from a messaging server configured to send the electronic message to the at least one user recipient based on the second dedicated network address;
analyzing a set of content in the electronic message, wherein the set of content comprises one or more Semantic Web attributes and one or more Semantic Web data relationships in a Resource Description Framework ("RDF"), wherein the Semantic Web attributes and Semantic Web data relationships in a Resource Description Framework have been manually typed by the user sender in syntactic patterns directly into the body portion of the electronic message without a use of templates and an automated agent to implement the RDF;
selecting, based on the analyzing, at least one semantic metadata analysis method from a plurality of semantic metadata analysis methods, wherein the plurality of semantic analysis methods comprises at least a natural language analysis method and a syntactic pattern analysis method;
extracting, based on the selected semantic metadata analysis method, from the electronic message a first attribute of the one or more Semantic Web attributes and a first data relationship of the one or more Semantic Web relationships; and
saving the first attribute and the first data relationship in a searchable storage.

12. The computer program product according to claim 11, wherein the electronic message comprises any one of an email received over the internet or an Instant Message received over the internet.

13. The computer program product according to claim 11, wherein the searchable storage comprises an annotation store.

14. The computer program product according to claim 11, wherein the extracting comprises any one of keyword analysis or natural language analysis.

15. The computer program product according to claim 11, wherein the extracting comprises:
performing natural language analysis of the electronic message.

16. The computer program product according to claim 11, wherein the first attribute and first data relationship are appended to predetermined attributes and relationships in the searchable storage.

17. The computer program product according to claim 11, wherein the automated agent receives the electronic message based on the user sender having manually directed the electronic message to the at least one other user and the automated agent by having actively inserted the dedicated network address associated with the at least one other user into a "To" field of the electronic message and having actively inserted the dedicated network address associated with the automated agent into a "CC" (Carbon Copy) portion of the electronic message.

18. The computer program product according to claim 11, further comprising:
retrieving Semantic Web attributes and Semantic Web relationships from the searchable storage, the attributes and relationships comprising the first attribute and the first relationship;
interpreting according to Semantic Web relationships and Semantic Web attributes, the retrieved Semantic Web attributes and Semantic Web relationships; and
presenting the interpreted Semantic Web relationships and Semantic Web attributes to a user wherein the presented Semantic Web relationships and Semantic Web attributes comprise any one of:
a project report, a conversation summary;
summarized project data;
summarized project data comprising references;
summarized project data comprising semantic relationships; or
browsing capability of semantic web related interconnected web items.

19. The computer program product according to claim 11, wherein data in the RDF is a set of Life Science Identifiers.

20. A system for generating Semantic Web relationships, the system comprising:
a network;
a computer system in communication with the network wherein the computer system includes instructions to execute a method comprising:
receiving, at an automated agent, an electronic message at a dedicated network address from a user sender,
the electronic message comprising the first dedicated network address and a second dedicated network address directing the electronic message to at least one user recipient, wherein the automated agent is separate and distinct from a messaging server configured to send the electronic message to the at least one user recipient based on the second dedicated network address;

analyzing a set of content in the electronic message, wherein the set of content comprises one or more Semantic Web attributes and one or more Semantic Web data relationships in a Resource Description Framework ("RDF"), wherein the Semantic Web attributes and Semantic Web data relationships in a Resource Description Framework have been manually typed by the user sender in syntactic patterns directly into a body portion of the electronic message without a use of templates and an automated agent to implement the RDF;

selecting, based on the analyzing, at least one semantic metadata analysis method from a plurality of semantic metadata analysis methods, wherein the plurality of semantic analysis methods comprises at least a natural language analysis method and a syntactic pattern analysis method;

extracting, based on the selected semantic metadata analysis method, from the electronic message a first attribute of the one or more Semantic Web attributes and a first data relationship of the one or more Semantic Web relationships; and saving the first attribute and the first data relationship in a searchable storage.

* * * * *